United States Patent [19]
Murdock

[11] Patent Number: 6,021,986
[45] Date of Patent: Feb. 8, 2000

[54] SNAP-IN MOUNT

[75] Inventor: Jay A. Murdock, Southgate, Mich.

[73] Assignee: Lear Automotive Dearborn, Inc., Southfield, Mich.

[21] Appl. No.: 09/088,341

[22] Filed: Jun. 1, 1998

Related U.S. Application Data

[60] Provisional application No. 60/053,591, Jul. 24, 1997.

[51] Int. Cl.[7] .................................................. A47F 5/00
[52] U.S. Cl. ............................ 248/289.11; 248/224.8; 248/231.9; 248/291.1; 296/97.11; 296/97.9; 296/214
[58] Field of Search .......................... 248/289.11, 291.1, 248/71, 224.8, 231.9, 27.1; 296/97.11, 214

[56] References Cited

U.S. PATENT DOCUMENTS

| | | |
|---|---|---|
| 2,687,862 | 8/1954 | Crowther . |
| 2,884,283 | 4/1959 | Korol et al. . |
| 4,529,157 | 7/1985 | Suman et al. . |
| 4,569,552 | 2/1986 | Marks . |
| 4,729,590 | 3/1988 | Adams . |
| 4,844,533 | 7/1989 | Dowd et al. . |
| 4,893,866 | 1/1990 | Dowd et al. . |
| 4,893,867 | 1/1990 | Hilborn et al. . |
| 4,902,068 | 2/1990 | Dowd et al. . |
| 4,913,484 | 4/1990 | Dowd et al. . |
| 4,989,911 | 2/1991 | Van Order . |
| 5,031,953 | 7/1991 | Miller ...................................... 296/97.9 |
| 5,056,853 | 10/1991 | Van Order . |
| 5,061,005 | 10/1991 | Van Order et al. . |
| 5,186,517 | 2/1993 | Gilmore et al. ......................... 296/214 |
| 5,201,564 | 4/1993 | Price ....................................... 296/97.9 |
| 5,236,240 | 8/1993 | Burns et al. ............................ 296/97.9 |
| 5,314,227 | 5/1994 | Weiland et al. ......................... 296/97.9 |
| 5,496,006 | 3/1996 | Kulka et al. ............................ 248/231.9 |
| 5,544,927 | 8/1996 | Snyder et al. ............................ 296/97.9 |
| 5,636,891 | 6/1997 | Van Order et al. ...................... 296/37.7 |
| 5,662,375 | 9/1997 | Adams et al. ............................. 296/214 |
| 5,857,728 | 1/1999 | Crotty, III ................................ 296/97.9 |
| 5,876,084 | 3/1999 | Smith et al. ............................... 296/214 |

FOREIGN PATENT DOCUMENTS

| | | |
|---|---|---|
| 0346158 | 12/1989 | European Pat. Off. . |
| 0348277 | 12/1989 | European Pat. Off. . |
| 2341940 | 6/1978 | Germany . |
| 9721559 | 6/1997 | WIPO . |

OTHER PUBLICATIONS

International Search Report, dated Nov. 29, 1989.
"Triangular Snap–in Mount" U.S. Patent Application filed Jun. 1, 1998 (inv. Murdock).

*Primary Examiner*—Ramon O. Ramirez
*Assistant Examiner*—Debbie D. Short
*Attorney, Agent, or Firm*—MacMillan, Sobanski & Todd, LLC

[57] ABSTRACT

A sun visor includes a visor body attached to a pivot rod. The sun visor is pivotally mounted to a vehicle roof and/or headliner by using a visor mount assembly. The visor mount assembly includes a mounting bracket, attached to the pivot rod, and a mount for securing the rod to the roof. The mount includes a base that attaches to the mounting bracket, and a plurality of spring members that extend outwardly from the base. The base is substantially triangular in shape and further includes base legs that extend outwardly from the base at an angle. Each spring member includes a cross piece, at least one first leg connecting the cross piece to the base, and at least one second leg extending outwardly from the cross piece in a cantilevered manner. When the sun visor mounted onto the vehicle roof by using the mount, the roof is located between the base and the second leg of each of the spring members.

17 Claims, 2 Drawing Sheets

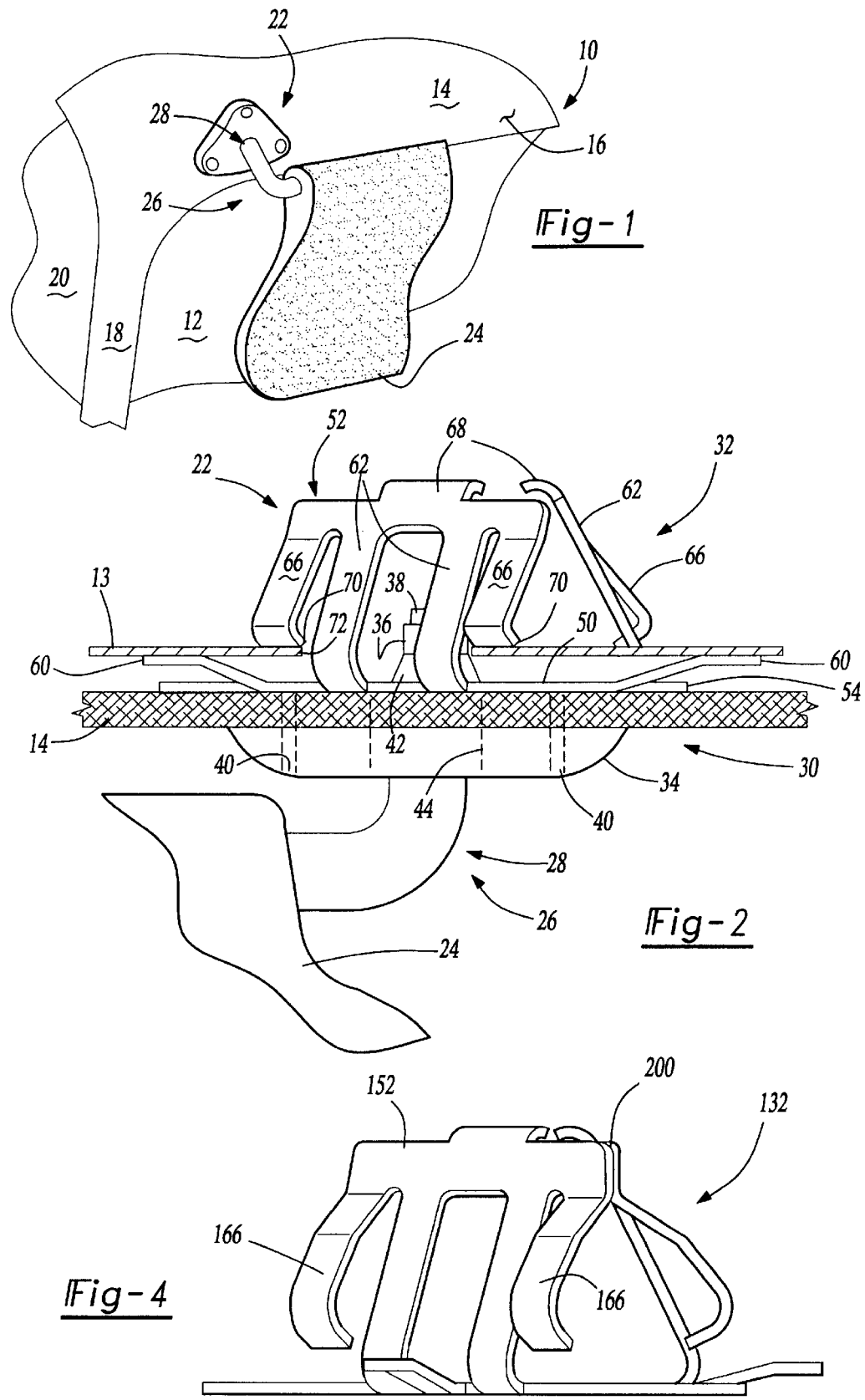

SNAP-IN MOUNT

This application claims benefit of provisional application 60/053591, filed Jul. 24, 1997.

BACKGROUND OF THE INVENTION

This application relates to a unique mounting apparatus for securing automobile components, such as sun visor pivot rod to a vehicle roof.

When driving a vehicle it is desirable to shield an occupant's eyes from glaring sunlight which enters the vehicle interior through the windshield or the side windows. As a result, the interior of vehicles is usually equipped with sun visors.

Visors typically include a visor body and a pivot rod assembly. The pivot rod assembly includes a L-shaped pivot rod, a torque control and a means for mounting the rod to the vehicle roof and/or headliner. The torque control rotationally mounts the visor body to the pivot rod. The torque control allows the visor body to be moved between and held at various rotational positions with respect to the rod. This allows the visor to be moved between a lowered position adjacent the windshield or side window to a raised position adjacent the roof and/or headliner.

Since the sun may enter the windshield or side window the rod mount should allow the visor to be pivoted between the windshield and the side window in the lowered position. A number of methods have been proposed for mounting the pivot rods to the roof and/or headliner. One known way is the snap-in type of mount. This type of mount is the easiest and quickest to install, since it is simply snap-fit within a hole in the roof and/or headliner, usually with the pivot rod attached prior to installation. This type of mount is also inexpensive to manufacture.

Many current snap-in mounts can be damaged or broken as the sun visor rod and mount are snapped into place. Additionally, the sun visor and mounts are not very stable due to low pull-out forces. Therefore it is desirable to have a snap-in mount with increased pull-out force for improved stability and robustness that is easy to assemble onto a pivot rod assembly and install on a vehicle.

SUMMARY OF THE INVENTION

A sun visor includes a visor body attached to a pivot rod. The sun visor is pivotally mounted to a vehicle roof and/or headliner by using a visor mount assembly. The visor mount assembly includes a mounting bracket and a mount that snaps into the vehicle roof. In a disclosed embodiment of this invention, the mount includes a base and a plurality of spring members extending outwardly from the base. The spring members each include at least a first leg, a second leg, and a cross piece. The cross piece is spaced apart from the base with the first leg connecting the cross piece to the base. The second leg is spaced apart from the first leg and extends outwardly from the cross piece in a cantilevered manner. The vehicle roof or other mounting surface is located between the base and the second leg of each of the spring members when the sun visor or other component is secured to the roof.

In a preferred embodiment of this invention, the second legs of each of the spring members flex inwardly as the mount is inserted through the roof of the vehicle and the base further includes a plurality of base legs extending outwardly from the base at an angle. The base legs exert a first force on one side of the roof and the second legs of the spring members exert a second force on the opposite side of the roof when the mount is snapped into the roof.

The subject invention offers several advantages over prior art systems because it provides a snap-in mount with increased pull-out force for improved stability and robustness that is easy to assemble and install on a vehicle.

These and other features of the present invention will be best understood from the following specification and drawings, the following of which is a brief description.

BRIEF DESCRIPTION OF THE DRAWINGS

FIG. 1 is a fragmentary perspective view of a sun visor assembly as installed in a vehicle.

FIG. 2 is a fragmentary perspective view of the sun visor assembly including a mount of the present invention.

FIG. 4 is a partial perspective view of another embodiment of the mount of the present invention.

DETAILED DESCRIPTION OF THE PREFERRED EMBODIMENT

Figure 3:
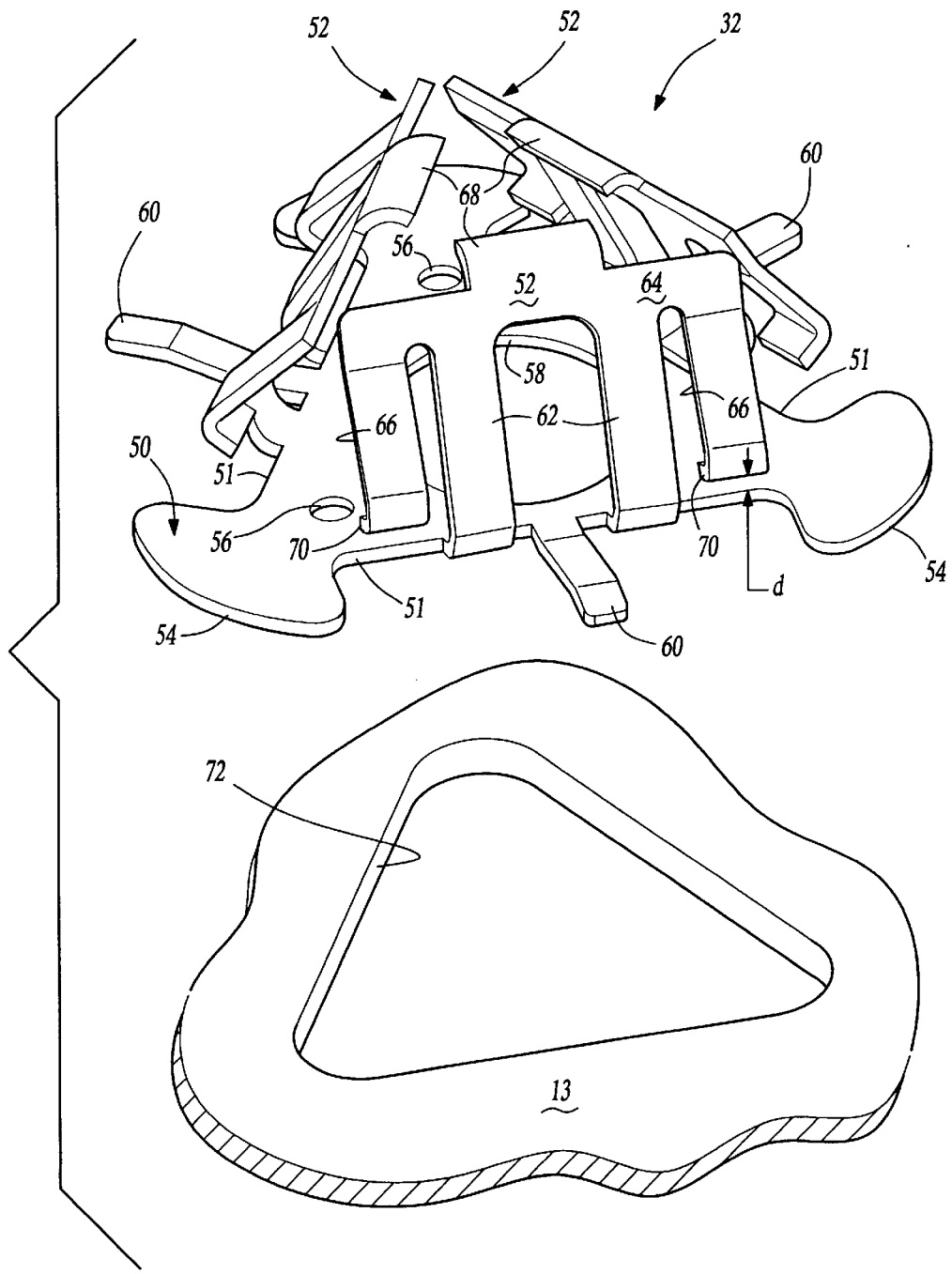
FIG. 3 is an enlarged, perspective, exploded view of a mount of the present invention.

Referring to FIG. 1, a vehicle 10 includes a windshield 12 and a roof 13 (as shown in FIG. 2). The roof 13 provides structural support for the vehicle interior, and is covered by a headliner 14 with an upholstered surface 16 to provide a trim appearance to the vehicle.

The vehicle further includes an A-pillar 18 separating the windshield 12 and a side window 20. A sun visor assembly 22 is shown on the driver's side of the vehicle.

The sun visor assembly 22 includes a visor body 24 and a pivot rod assembly 26. The visor body 24 is substantially rectangular and includes a channel (not shown). The channel longitudinally extends along a portion of the top edge of the visor body 24. When cloth or the like is wrapped around the visor body 24 the channel is enclosed.

Referring to FIG. 2, the pivot rod assembly 26 mounts the visor body 24 to a mounting surface, such as the vehicle roof 13. The pivot rod assembly 26 includes a torque control (not shown), a L-shaped pivot rod 28, and a visor mount assembly 30.

The torque control (not shown) rotationally mounts the visor body 24 to the rod 28, and rests within the visor body channel. The torque control used is conventional, and allows the visor body 24 to be moved between and held at various rotational positions with respect to the rod 28. This allows the visor body 24 to be moved between a lowered position adjacent the windshield 12 or side window 20 to a raised position adjacent the roof 13 and/or headliner 14.

The visor mount assembly 30 includes a mount 32, a mounting bracket 34, a compression spring 36, and a locking nut 38. The mounting bracket 34, of generally conventional construction, includes a body with a collar 42, three apertures 40 around the periphery (only two (2) are shown), and a central aperture 44. The collar 42 surrounds the central aperture 44 (shown in phantom). In another embodiment the rod 28 and bracket 34 could attach using a snap-fit design or the like.

The end of the rod 28 extends upwardly through the central aperture 44, and is secured in tension utilizing the compression spring 36 and the locking nut 38 in a conventional manner. The rod 28 is pivotable with respect to the bracket 34. Thus, a subassembly is formed.

Referring to FIGS. 2 and 3, mount 32 secures the subassembly to the vehicle roof 13, and includes a base 50 and a plurality of spring members 52. Preferably, the mount 32 has three (3) spring members, however, more or less could be used.

Preferably, base 50 is substantially triangular in shape with three edges 51 and three (3) corners. The base 50 further includes flat projections 54, three peripheral apertures 56, a central aperture 58, and three base legs 60.

The flat projections 54 extend outwardly from each base corner. Apertures 56 are disposed near each base corner at positions which will align with the three peripheral apertures 40 in the mounting bracket 34. The central aperture 58 is disposed at the center of the base 50. Each base leg 60 extends outwardly and upwardly from a point near the center of each associated edge 51.

Each of the spring members 52 extend from one of the associated edges 51. This makes the mount 32 resemble a pyramid in shape. Each spring member 52 includes a cross piece 64, at least one first leg 62, and at least one second leg 66. The cross piece 64 is spaced apart from the base 50 and is preferably orientated to be substantially parallel to the base 50. The first leg 62 extends between the cross piece 64 and the base 50, and the second leg 66 extends downwardly from the cross piece 64 in a cantilevered manner. The vehicle roof 13 is to be located between the base 50 and the second legs 66 of each of the spring members 52 when the visor mount assembly 30 is secured to the roof 13.

In the preferred embodiment, the mount 32 has three (3) spring members 52 and each spring member 52 includes two central first legs 62 and two outer second legs 66 located on opposite sides of the two central first legs 62. The three (3) spring members 52 each extend upwardly from their respective edge 51 of the base 50. The spring members 52 also extend inwardly toward each other such that each spring member 52 is orientated at an angle with respect to the base 50. Preferably, the first legs 62 are disposed on opposite sides of the base leg 60 on the associated edge 51.

The two second legs 66 extend downwardly and outwardly from ends of the cross piece 64 on opposite sides of the first legs 62 in a cantilevered manner. Thus, the second legs 66 have free ends 70 that are inwardly curved and terminate a distance, represented by the arrow "d" (FIG. 3), from the base 50. The distance "d" should be large enough to accommodate the thickness of the roof 13.

It is recommended that the material for the mount 32 be limited to a suitable spring steel, however, other materials may be used. The mount 32 is preferably integrally formed in a progressive die, heat treated, and finished with a finishing treatment common to the industry.

Installation of the sun visor assembly 22 will now be discussed with reference to FIGS. 2 and 3. The rod 28 and mount 32 are installed so that the headliner 14 is sandwiched between the two. The headliner 14 may be the modular type, where the headliner accessories are attached to the headliner 14 before the headliner 14 is installed in the vehicle. When the mount 32 is fully installed, the collar 42 extends through the central aperture 58 of the base 50, and the mount 32 is attached to the opposite side of the headliner 14 from the mounting bracket 34, using a number of fasteners (not shown), such as screws, which extend through the mounting bracket apertures 40, headliner 14, and the base apertures 56.

The mount 32 is inserted into a roof aperture 72 in the sheet metal roof 13 and headliner 14. As shown in FIG. 3, the roof aperture 72 is shaped like an equilateral triangle to receive the pyramid shaped spring members 52. The corners of the aperture 72 are rounded to relieve stress. The cross sectional area of the aperture 72 is less than the cross sectional area of the base 50. Thus when the mount 32 is installed on the roof 13, the spring members 52 have been snap-fit through the aperture 72 and are located on one side of the roof 13 while the base 50 is located on the opposite side of the roof 13 near the headliner 14.

Each cross piece 64 includes a curved projection 68 which extends upwardly and inwardly toward the center of the mount 32. The curved projections 68 present a sliding surface that engages edges of the roof aperture 72 as the mount 32 is inserted through the roof 13. The curved projections 68 of the spring members 52 help easily guide the mount 32 into the roof aperture 72. As the mount 32 is inserted the spring members 52 flex inwardly and the second legs 66 on each spring member 52 flex inwardly.

In a modified embodiment, the mount 32 could have offset corners on the projections 54 which would engage the bottom surface of the sheet metal roof 13. This would eliminate the need for three (3) base legs 60.

Upon full insertion of the mount 32, the base 50 is below the roof 13. The base legs 60 engage the lower face of the roof 13 and the second legs 66 engage the upper face of the roof. The flat projections 54 extend outwardly from each corner of the base 50 and are spaced apart from the roof 13 when the mount 32 is attached to the roof 13. Preferably, when the mount 32 is fully installed, the flat projections 54 engaged the headliner 14 while the base legs 60 engage the roof 13. Since the base legs 60 are flexible and the base 50 is spaced from the sheet metal, flexure of the legs 60 permits the mount 32 to adjust if the hole in the roof 13 is not uniform and includes metal extending at various thicknesses about the perimeter.

The free ends 70 of the second legs 66 engage the upper face of the roof 13 near the aperture 72. Thus, when the mount 32 is fully installed, the base legs 60 exert a force on one side of the roof and the second legs 66 exert a force on the opposite side of the roof, which securely attaches the rod 28 to the vehicle roof 13, while allowing the rod 28 to pivot. The mount 32 should be formed so that the distance "d" between the free ends 70 of the second legs 66 and the base 50 is large enough to accommodate the roof 13 while ensuring that the second legs 66 exert the necessary amount of force to securely hold the mount 32 in place.

Referring to FIG. 4, a modified mount 132 is shown. The mount 132 is similar to that discussed above except each of the spring members 152 now includes second legs 166 which have multiple bends, and each spring member 152 engages the adjacent spring member 152 at the corners 200.

The multiple bends in the second legs 166 allow these legs 166 to curve more significantly. This allows the engagement of the second legs 166 with the sheet metal 13 to require an increased pullout force, as the legs 166 must be displaced an additional amount to for the mount 132 to be removed.

The abutting corners 200 of each of the spring members 152 increases the stability and robustness of the mount 132 by preventing movement of the spring members 152 during installation and use. This ensures that all of the movement necessary to insert the mount 132 will result from the flexure of the second legs 166.

The principal advantage of the present invention is that the snap-in type mount provides a simple design which is easy to assemble to the rod subassembly and install in the vehicle.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include, but are not limited to, modifying the shape of the mount, including modifying the shape of the projections, second legs, base legs, and curved projections. Furthermore, the mount can be used with a headliner that is already attached to the roof and the base legs engage the lower side of the headliner and the second legs engage the upper side of the headliner. In addition, the mount can be used to secure other interior components in a vehicle, for example it can be used with door panels. It is therefore contemplated that the appended claims will cover any such modification or embodiments that fall within the true scope of the invention.

Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A mount for securing a component to a mounting surface, said mount comprising:

a substantially triangular base for supporting said component; and at least three spring members extending outwardly from said base, said spring members each including a cross piece spaced apart from said base with at least one first leg connecting said cross piece to said base and at lease one second leg spaced apart from said first leg and extending outwardly from said cross piece in a cantilevered manner, wherein the mounting surface is adapted to be located between said base and said leg of each of said spring members when the component is secured to the mounting surface.

2. A mount as recited in claim 1, wherein said second legs of said spring members flex inwardly as said mount is inserted through an aperture in the mounting surface.

3. A mount as recited in claim 2, wherein said second legs of said spring members engage a top face of the mounting surface and said base engages a bottom face of the mounting surface upon insertion of said mount into the aperture.

4. A mount as recited in claim 2, wherein said base includes a plurality of base legs, said base legs extending outwardly from said base such that when said mount is inserted through the aperture, said base legs exert a first force on one face of the mounting surface and said second legs of said spring members exert a second force on an opposite face of the mounting surface.

5. A mount as recited in claim 2, wherein said base has a cross sectional area that is greater than said cross sectional area of the aperture.

6. A mount as recited in claim 1, wherein said base includes three edges and three corners.

7. A mount as recited in claim 6, wherein said base includes a flat projection extending outwardly from each corner, said flat projections being spaced apart from the mounting surface when said mount is attached to the mounting surface.

8. A mount as recited in claim 6, wherein each one of said spring members extends outwardly from one of said three edges, said spring members further extending inwardly toward each other such that each spring member is oriented at an angle with respect to said base.

9. A mount as recited in claim 1, wherein at least one first leg is comprised of a pair of first legs and at least one second leg is comprised of a pair of second legs, said pair of first legs being spaced apart from one another and extending between said base and said cross piece and said pair of second legs being spaced apart from said pair of first legs and extending outwardly from said cross piece in a cantilevered manner.

10. A mount as recited in claim 9, wherein each of said cross pieces includes a first end and a second end, with one of said second legs being located at said first end and the other of said second legs being located at said second end wherein said pair of first legs are located between said pair of second legs.

11. A visor mount assembly for mounting a visor to a vehicle roof comprising:

a mounting bracket connected to said visor; and a mount for receiving said mounting bracket, said mount including a substantially triangular base and at least three spring members extending outwardly from said base, said spring members each including a cross piece spaced apart from said base with at least one first leg connecting said cross piece to said base and at least one second leg spaced apart from said first leg and extending outwardly from said cross piece in a cantilevered manner, wherein the mounting surface is adapted to be located between said base and said second leg of each of said spring members when the component is secured to the roof.

12. A visor mount assembly as recited in claim 11, wherein said base of said mount includes a central aperture and said mounting bracket includes a body with a collar member, said collar member extending outwardly from said body through said central aperture of said base.

13. A visor mount assembly as recited in claim 11, wherein said second legs of said spring members flex inwardly as said mount is inserted through an aperture in the roof.

14. A visor mount assembly as recited in claim 13, wherein each of said spring members includes a curved projection extending outwardly from said cross piece toward a center of the roof aperture, said curved projections presenting a sliding surface for engaging edges of said aperture as said mount is inserted through the roof.

15. A visor mount assembly as recited in claim 13 wherein said base has a cross sectional area that is greater than said cross sectional area of the roof aperture and said base further includes a plurality of base legs, said base legs extending outwardly from said base such that when said mount is inserted through the roof aperture, said base legs exert a first force on one face of the roof and said second legs of said spring members exert a second force on an opposite face of the roof.

16. A visor mount assembly for mounting a visor to a vehicle roof comprising:

a mounting bracket connected to said visor, and a mount adapted to receive said mounting bracket, said mount including:

a substantially triangular base with three edges and three corners and a flat projection extending outwardly from each of said corners, said flat projections being adapted to be located between the roof and said mounting bracket; and three spring members each extending outwardly from said base and inwardly toward each other so that each said spring member is oriented at an angle with respect to said base, said spring members each including a cross piece spaced apart from said base with at least one first leg connecting said cross piece to said base and at least one second leg spaced apart from said first leg and extending outwardly from said cross piece in a cantilevered manner, wherein the vehicle roof is adapted to be located between said base and said second leg of each of said spring members when said visor is secured to the roof.

17. A visor mount assembly for mounting a visor to a vehicle roof comprising:
   a mounting bracket adapted to be connected to the visor; and
   a mount adapted to receive said mounting bracket, said mount including:
      a base with at least three edges and at least three corners and a projection extending outwardly from each of said corners, said projections being adapted to be located between the roof and said mounting bracket; and
      at least three spring members each extending outwardly from said base and inwardly toward each other so that each said spring member is oriented at an angle with respect to said base, said spring members each including a cross piece spaced apart from said base with at least one first leg connecting said cross piece to said base and at least one second leg spaced apart from said first leg and extending outwardly from said cross piece in a cantilevered manner, wherein the vehicle roof is adapted to be located between said base and said second leg of each of said spring members when the visor is secured to the roof.

* * * * *